United States Patent [19]
Brady et al.

[11] Patent Number: 5,217,798
[45] Date of Patent: Jun. 8, 1993

[54] WATER SENSITIVE HOT MELT ADHESIVES FOR NONWOVEN APPLICATIONS

[75] Inventors: Francis Brady, Bethlehem, Pa.; Gary Raykovitz, Flemington; Paul Puletti, Pittstown, both of N.J.; Thomas Kauffman, Easton, Pa.; Jules Schoenberg, Scotch Plains, N.J.

[73] Assignee: National Starch and Chemical Investment Holding Corporation, Wilmington, Del.

[21] Appl. No.: 696,674

[22] Filed: May 7, 1991

[51] Int. Cl.$^5$ .............................................. B32B 7/00
[52] U.S. Cl. ................................ 428/246; 156/296; 156/327; 427/202; 428/284; 525/404; 604/366
[58] Field of Search ............... 156/327, 296; 525/404; 428/246, 284; 604/366; 427/202

[56] References Cited

U.S. PATENT DOCUMENTS

| | | |
|---|---|---|
| 3,033,841 | 5/1962 | Germain. |
| 3,369,948 | 2/1968 | Ostmann ............................ 156/296 |
| 3,666,595 | 5/1972 | Bauer ................................. 156/327 |
| 3,891,584 | 6/1975 | Ray-Chaudhuri et al. ......... 524/270 |
| 4,675,209 | 6/1987 | Pedigrew ........................... 427/202 |

FOREIGN PATENT DOCUMENTS

| | | | |
|---|---|---|---|
| 922457 | 4/1963 | United Kingdom ................ 525/404 |
| 2133345 | 7/1984 | United Kingdom ................ 428/284 |

*Primary Examiner*—John J. Gallagher
*Attorney, Agent, or Firm*—Ellen T. Dec; Edwin M. Szala

[57] ABSTRACT

Nonwoven assemblies bonded with water dispersible or sensitive hot melt adhesives comprising 50-100 parts of a graft copolymer of about 40-85% of at least one vinyl monomer and about 15-60% of at least one water soluble polyalkylene oxide polymer, and about 0-50 parts by weight of tackifying resin. The compositions may also be employed as water sensitive binders in the manufacture of the nonwoven. Vinyl acetate is the preferred vinyl monomer whereas ethylene oxide homo- or co-polymers are the preferred polyalkylene oxide. The use of tackifying resin is optional and may be undesirable for many of the applications.

16 Claims, No Drawings

WATER SENSITIVE HOT MELT ADHESIVES FOR NONWOVEN APPLICATIONS

BACKGROUND OF THE INVENTION (A nonwoven fabric is defined as an interlocking (fiber) network characterized by flexibility, porosity and integrity.) The individual fibers used to compose the nonwoven fabric may be synthetic, naturally occurring, or a combination of the two. The individual fibers may be mechanically, chemically, or thermally bonded to each other. Nonwovens are used commercially for a variety of applications including insulation, packaging, household wipes, surgical drapes, medical dressings, and in disposable articles such as diapers, adult incontinent products and sanitary napkins. (Tissue is a closely related material in which the individual fibers may or may not be chemically bonded to one another.)

In may of the aforementioned applications it is necessary to adhere the nonwoven or tissue to another substrate or component. (The second substrate may be another nonwoven, tissue, or an unrelated material.) A commonly employed technique to bond the assembly together is the use of a hot melt adhesive. Hot melt adhesives allow for cost and time efficient manufacturing since there is no evaporation step necessary as is the case for water based or solvent based adhesive systems. Suitable hot melt adhesives must possess excellent adhesion to the substrates involved. For nonwoven applications they must also possess good flexibility (or hand), no staining or bleed through, suitable viscosity, set speed and open time to function on commercial available equipment and finally, acceptable thermal aging properties.

(Recently a variety of nonwoven and tissue applications have been developed which require that the hot melt adhesive demonstrate appreciable water solubility, dispersibility or sensitivity.) In these situations the hot melt adhesive must provide a durable bond to the nonwoven or tissue until exposed to a predetermined condition (e.g., room temperature water), after which the adhesive would release from the substrate(s). This ambient water releasability is a particularly desirable property in the disposable market where flushability and/or degradeability are becoming critical.

(Such a water soluble, dispersible or sensitive composition would also find utility as a binder to chemically bond the nonwoven fibers together in the manufacture of the nonwoven fabric or tissue.) Such a thermoplastic, water sensitive binder would allow for high speed manufacturing and would produce a nonwoven or tissue which would disintegrate under a desired condition.

SUMMARY OF INVENTION

It has now been discovered that a specific class of hot melt adhesives and/or binders based on 50-100 parts of a graft copolymer comprising about 40-85 weight percent of at least one vinyl monomer and about 15-60 weight percent of at least one polyalkylene oxide polymer and 0-50 parts by weight of a compatible tackifying resin, is desirable for bonding nonwoven and/or tissue substrates to themselves or to other substrates, (yet will later release upon exposure to ambient temperature water.) (This class of compositions is also recognized as useful as nonwoven binders for chemically bonding the individual fibers to one another.) These adhesives and/or binders are characterized by a glass-transition temperature (Tg) of $-40°$ C. to $+40°$ C. as determined by the maximum value of $G''/G'$ or Tan $\delta$ when measured using the Rheometrics Dynamic Spectrometer at 10 radians per second.

(The graft copolymers used herein are actually mixtures of graft and homopolymers of the respective monomers.) For convenience these graft copolymer/homopolymer mixtures will be referred to as "graft copolymers" throughout the specification and claims. (The preferred vinyl monomer used in the graft copolymer is vinyl acetate or an alkyl-substituted acrylate such as methyl acrylate or ethyl acrylate or mixtures thereof.) (The preferred polyalkylene oxide is a polyethylene oxide homo- or copolymer with a molecular weight of 3,000-100,000). Preferred tackifying resins for those adhesives which are tackified include rosin, hydrogenated rosin, rosin esters, terpene phenolic and dimerized rosins. As noted above, the use of tackifying resin is optional and may in fact prove undesirable for a number of applications. Other conventional additives such as plasticizers, antioxidants, pigments, dyes and waxes may be optionally incorporated into the adhesives.

The specific formulation of the water sensitive hot melt adhesives will vary depending upon the intended end use thereof. (Thus, adhesives comprising 100% of the graft copolymer are particularly useful for bonding superabsorbent particulate materials onto nonwoven substrates were releasability of the superabsorbent is desired.) These untackified hot melt adhesives are also highly suitable for creping adhesives and in tissue/tissue bonding of flushable paper products.

On the other hand, highly tackified graft copolymer hot melt adhesives, particularly those prepared from the higher molecular weight (e.g., those having a viscosity greater than about 5000 cps at 175° C.) graft copolymers are especially suited for end uses where toughness and adhesion as well as flexibility are desired. As such, they find use as construction adhesives for (disposable diapers) where water sensitivity at relatively low temperatures is desirable so as to provide release from the various substrates to facilitate flushability of all or of a portion of the diaper.

Other hot melt adhesive compositions containing intermediate levels of tackifier are also useful as adhesives or binders in other areas of nonwoven and/or tissue manufacture including in less demanding construction adhesives, nonwoven garment construction, disposable wipes and the like.

DETAILED DESCRIPTION

The specific water-soluble polyalkylene oxide polymers used in the graft copolymers described herein have a molecular weight of about 3,000 to 100,000 and a polymerized ethylene oxide content of at least 50% by weight. The polyalkylene oxide polymers may be homopolymers of ethylene oxide (including the ester and ether derivatives thereof), random copolymers of ethylene and propylene oxide, block copolymers of ethylene and propylene oxides, or mixtures thereof. It will be noted that mixtures of different polyalkylene oxide polymers may be utilized, and copolymers and homopolymers may be used together in such mixtures. The polymers are commercially available from companies such as Union Carbide (the polyethylene oxide polymers, poly (ethylene oxide/propylene oxide )copolymers and monomethyl ethers of polyethylene oxide), BASF Wyandotte (the block copolymers) and Dow Chemical Company (the homopolymers and random copolymers). More specifically, the Union Carbide products sold under the trade names CARBOWAX (for polyethylene oxides) and METHOXY CARBOWAX (for the monomethyl ethers of polyethylene oxide) have an average molecular weight roughly indicated by the numeral following the trade name.

The polymerized ethylene oxide content of the polyalkylene oxide polymer should be at least 50% by weight of the polymer and preferably at least 75%. Polymers having a lower content of polymerized ethylene oxide groups display only limited solubility in water, and hence are not useful as the water-sensitive polymer component of the present invention. Polyalkylene oxide polymers containing less than about 50% by weight of polymerized ethylene oxide are, however, useful as plasticizers or diluents.

The polyalkylene oxide polymers having a molecular weight of less than about 3,000, when used as the sole polyalkylene oxide, have been found not to impart water dispersibility to the graft copolymers, and hence, such lower molecular weight polyalkylene oxide fractions should not be included in determining the proportion of the water-soluble component present in the graft copolymer. On the other hand, such low molecular weight polyalkylene oxides (e.g., CARBOWAX 600) are useful in plasticizers or diluents.

The vinyl monomers useful in the graft copolymers of the present invention are preferably vinyl acetate and the lower alkyl-substituted acrylates or methacrylates such as methyl acrylate and ethyl acrylate. Other useful vinyl monomers include the alkyl esters of acrylic acid containing 1 to 10 carbon atoms in the alkyl portion; styrene; and vinyl esters such as vinyl propionate, vinyl butyrate, vinyl 2-ethylhexanote and the like. Use of the vinyl monomers, and in particular the vinyl acetate monomer, provides sufficient chain transfer in grafting to produce a graft copolymer which is thermally stable, moderately polar are readily formulatable into an adhesive. The graft copolymer preferably comprises from about 40 to 85% of at least one vinyl monomer and about 15-60% by weight of at least one water-soluble polyalkylene oxide polymer, and most preferably contains 15 to 45% by weight of the polyalkylene oxide component(s).

(While various vinyl monomers may be utilized by themselves for grafting onto the water-soluble polymer backbone,) small amounts of other ethylenically unsaturated monomers may be utilized as comonomers with the vinyl monomer to improve particular properties such as water-dispersibility, adhesion, softness and the like. Monomers useful as comonomers with the vinyl monomers include 2-hydroxyethyl acrylate, N-vinyl pyrrolidone, sodium vinyl sulfonate (the sodium salt of ethylene sulfonic acid) and the alkyl esters of metharylic acid containing 1-8 carbon atoms int he alkyl portion. Such comonomers are generally utilized in quantities not exceeding about 40% by weight of the total graft copolymer.

(The graft copolymers used herein as well as a process for the production thereof is described in U.S. Pat. No. 3,891,584 issued Jun. 24, 1975 to Ray-Chaudhuri, et al., the disclosure of which is incorporated by reference.)

In addition to the water-soluble polyalkylene oxide polymer or polymers, vinyl monomer or monomers and optional ethylenically unsaturated monomers, the adhesive may also contain one or more compatible tackifying resins in amounts up to about 50% by weight. Such resins primarily produce a reinforcing effect or plasticizing (flexibility) effect, but also contribute stickiness, particular wetting ability, and viscosity control to the graft copolymer. Exemplary of such tackifying resins are rosin (from gum, wood or tall oil) and the rosin derivatives, the phenolic modified coumarone indene resins (sold by Neville Chemical Company of Neville Island, Pa. under the trade name of NEVILLAC), the coumarone indene resins with softening points of about 5° to 117° C. (sold by the aforementioned Neville Chemical Company under the trade name CUMAR, the phenolic modified terpene resins (sold by Arizona Chemical Company, Inc. of Elizabeth, N.J. under the NIREZ trade name). (The softening points of the resins referred to above are Ball and Ring softening points determined using method ASTM E28-58T). As noted above and as illustrated in the Examples presented herein, particularly preferred adhesives for certain applications are prepared using levels of tackifier in excess of about 25% by weight.

The adhesive may also contain small amounts, i.e., up to about 25% by weight, of a compatible plasticizing oil and/or wax diluent. Particularly useful are diluents selected from the group consisting of glycerol mono- and distearate, synthetic long chain linear polymeric alcohols, stearic acid, high acid number waxlike materials of mono- or dicarboxylic acids, acid wax derived from montan wax, stearyl alcohol, hydrogenated castor oil, ethoxylated alcohols, 12(OH) stearic acid and stearic-cetyl alcohol.

The resulting adhesives of the present invention are characterized by their ability to provide a durable bond to a nonwoven or tissue article and otherwise meet the unique requirements of the application (including flexibility, non-staining, and machinable viscosity) and later release upon exposure to water at ambient temperatures after a desired residence period. The adhesives described herein also posses exceptional thermal stability which distinguishes them from other moisture sensitive adhesives. Additionally, many of the compositions described herein display long open time and pressure sensitivity necessary for spray or melt blown application methods, yet later (e.g., after several hours or days), slowly crystallize. This crystallization results in a loss of surface tack but does not detract appreciably from adhesion. In addition, the crystallization actually enhances properties such as elevated temperature peel and shear resistance and resistance to strike-through.

(The adhesive product can be applied to a substrate such as a nonwoven article or tissue by a variety of methods including coating or spraying in an amount sufficient to cause the article to adhere to another substrate such as tissue, nonwoven, or an unrelated material such as a low density polyolefin or other conventionally employed water impermeable substrate.) When exposed to water of a specific temperature for a specific period of time, the nonwoven or tissue releases.

The following examples illustrate the production of suitable hot melt adhesives or binders as well as the use thereof in a variety of applications. In the examples, all parts are by weight and all temperatures in degree Celsius unless otherwise noted. Test procedures used herein are as follows:

TEST PROCEDURES

Melt viscosities of the hot melt adhesives/binders were determined on a Brookfield RVT Thermosel viscometer using a number 27 spindle at 20 or 50 rpms.

The heat stability of the adhesive/binder samples was determined in the following manner: a 60 gram sample was stored in a covered jar at 175° C. for 72 hours and observed for the formation of gel, skin or any deleterious change in color. The viscosity change upon this thermal aging was then determined as stated above.

The glass transitions temperature, Tg, of the samples was determined using a Rheometrics Dynamic Analyzer (RDA-700). Specifically, 0.15-0.20 gram of the sample was placed between 8 mm parallel plates at a separation of 2.0-2.5 mm. The sample as then cooled to approximately −80° C. and then heated at 5° C./minute to >60° C. while stressed in a sinusoidal manner at a rate of 10 radians/second. The strain was adjusted throughout the test from 0.03% to a maximum of 10%. The temperature corresponding to the maximum value of the ratio of loss modulus G" to storage modulus G' (this ratio is also referred to as Tan Delta) is recorded as the glass transition temperature, Tg.

Polypropylene nonwoven to nonwoven bonds used in testing nonwoven adhesion and water sensitivity were prepared by applying a 1.0-1.5 mm wide (compressed) bead of molten hot melt at 350°-375° F. to one piece of 2"×6" nonwoven and mating it to a second piece of nonwoven at the same size. Open time was <2 seconds and dwell time 10 seconds. These bonds were then aged at 70° F./50% RH.

Nonwoven adhesion of the various samples was determined by pulling polypropylene nonwoven to polypropylene nonwoven bonds apart in a peel mode at 12"/min on an Instron tester. The bond is characterized by the presence or absence of fiber tear (F.T.) and/or the amount of resistance (lbs/in). If F.T. was noted on all three samples, the amount of resistance was not recorded. Conventional hot melt adhesives used for bonding nonwovens typically display fiber tearing bonds (F.T.) and/or resistance ≧0.2 lb/in.

Water sensitivity of nonwoven bonds prepared with the hot melt adhesive/binder samples was determined by immersing polypropylene nonwoven to polypropylene nonwoven (which had been aged 1 week at 70° F./50% RH) in water at various temperatures for various lengths of time. After a specified time interval (e.g., 15 minutes) a nonwoven to nonwoven bond was removed from the water and stressed by hand in a peel mode. The bond is characterized as fiber tearing (F.T.) or non-fiber tearing (no F.T.). Conventional hot melt adhesives and binders used for nonwovens would produce fiber tearing bonds and/or bonds with good resistance both before and after immersion. The adhesives and binders used in the present invention are characterized by various levels of water sensitivity which result in a reduction in bond strength to nonwoven after immersion in water for a specified time interval and/or at a specified temperature.

180° T Peel Testing Procedure

The samples are prepared as follows. A glue line was extruded onto nonwoven at approximately 300°-325° F. with a line speed of 100 FPM to form a glue line approximately 0.5 mm wide with a coating weight of approximately 4-6 mg/linear inch. A second nonwoven substrate was immediately bonded to the glue bead with bonding pressure of approximately 60 psi. Samples were then cut parallel to adhesive lines, leaving at least ⅛" on each side of the exterior adhesive lines. The samples were conditioned overnight at 70° F./50% RH constant temperature and humidity.

Instron Testing: The ends of each sample were taped, then placed in jaws, with the adhesive coated nonwoven in the stationary jaw. The sample was pulled at 12 in/min crosshead speed, 2 in/min chart speed in 180° T peel mode and the average peel value recorded in grams or pounds for each product tested. The deformation and the type of failure (adhesive, cohesive) were also recorded.

EXAMPLE

A useful graft copolymer of 30 parts poly (ethylene oxide) (PEG) and 70 parts vinyl acetate (VA) was prepared by charging the following ingredients into a one liter flask;

| | |
|---|---|
| Polyglycol E-8000 (Dow Chemical Co.) | 150 g |
| t-butyl peroxyperbenzoate | 0.4 g |

The flask was fitted with a stainless steel stirrer, thermometer, condenser, nitrogen inlet tube and dropping funnel containing 350 g of vinyl acetate. 45 ml of the vinyl acetate was added and the mixture was heated to reflux. 1 ml of a 10% solution of 70% benzoyl peroxide in ethyl acetate was added to initiate the polymerization. The remainder of the vinyl acetate was added over a three hour period. The reaction mixture was heated to 155° to 160° C. and held at this temperature for 15 minutes. 1.5 gram of Irganox 1010 antioxidant (Ciba-Geigy) was added and the residual monomer was removed by vacuum distillation. The viscosity of the product was 2,525 cps. at 350° F.

Similar graft copolymers were prepared using other proportions of vinyl acetate and PEG 8000 as shown in Table I. The resultant graft copolymers were then tested "neat" as adhesives for nonwovens. The results of the testing are also shown in Table I.

TABLE I

| | 1 | 2 | 3 | 4 |
|---|---|---|---|---|
| 60 vinyl acetate/40 PEG-8000 copolymer | 100.0 | — | — | — |
| 70 vinyl acetate/30 PEG-8000 copolymer | — | 100.0 | — | — |
| 80 vinyl acetate/20 PEG-8000 copolymer | — | — | 100.0 | — |
| 90 vinyl acetate/10 PEG-8000 copolymer | — | — | — | 100.0 |
| Viscosity @ 350° F. | 1310 cps | 2500 cps | 6475 cps | 13,775 cps |
| Glass Transition Temp (Tg) | −8° C. | +5° C. | +20° C. | +36° C. |
| Nonwoven Adhesion | F.T. | F.T. | F.T. | F.T. |
| Water Sensitivity | | | | |
| 15 min/70° F. | No F.T. | No F.T. | F.T. | F.T. |
| 24 hrs/70° F. | No F.T. | No F.T. | F.T. | F.T. |
| 15 min/100° F. | No F.T. | No F.T. | F.T. | F.T. |
| 24 hrs/100° F. | No F.T. | No F.T. | No F.T. | F.T. |
| Heat Stability (72 hrs/350° F.) | | | | |
| Color | Amber | Dark Amber | Dark Amber | Dark Brown |
| Gel | None | None | None | None |
| Skin | None | None | None | None |
| % Viscosity Change | −38.9% | −7.5% | −7.3% | +3.2% |

The results presented in Table 1 demonstrate the suitability of the untackified graft copolymers containing greater than 10% grafted polyalkylene oxide and characterized by glass transition values of between −40° C. and +40° C. for providing a fiber tearing bond to nonwoven, which bond also demonstrates water sensitivity either at 70° F. or 100° F. These unformulated copolymers also demonstrate good heat stability (no skin or gel is formed).

In the following examples, various graft copolymers were formulated with various tackifying resins and/or oils and tested as adhesives for non-woven substrates.

by the addition of compatible resins such as gum rosin at levels such as 20 and 30 percent (8 and 9). Also useful as compatible resins are rosin ester (10) and dimerized rosin (11).

EXAMPLE 3

A graft copolymer of 70 weight percent vinyl acetate and 30 weight percent polyethylene oxide of 8000 molecular weight was prepared as described in Example 1.

TABLE 2

|  | 5 | 6 | 7 | 8 | 9 | 10 | 11 | 12 |
|---|---|---|---|---|---|---|---|---|
| 60 vinyl acetate/25 PEG-8000/15 Ucon 75H-90,000 | 100.0 | 70.0 | — | — | — | — | — | — |
| Brazilian Gum Rosin | — | 30.0 | — | 20.0 | 30.0 | — | — | — |
| 35 vinyl acetate/35 vinyl 2-ethylhexanoate/25 Ucon 25H-90,000/15 PEG-8000 | — | — | 100.0 | 80.0 | 70.0 | 75 | 75 | — |
| Permalyn 85 | — | — | — | — | — | 25 | — | — |
| Dymerex | — | — | — | — | — | — | 25 | — |
| Stereon 840A | — | — | — | — | — | — | — | 21 |
| Zonatac 105 | — | — | — | — | — | — | — | 60 |
| Kaydol USP White Mineral Oil | — | — | — | — | — | — | — | 19 |
| Viscosity at 350° F. | 3275 cps | 920 cps | 9500 cps | 2810 cps | 1855 cps | 3763 cps | 3800 cps | 1530 cps |
| Glass Transition Temp. (Tg) | −5° C. | +10° C. | +4° C. | +3° C. | +8° C. | +22° C. | +11° C. | +16° C. |
| Nonwoven Adhesion (pp/pp-12"/min) | F.T. | F.T. | Not Tested | 0.5 lb/in | F.T. | 0.5 lb/in F.T. | 0.8 lb/in F.T. | F.T. |
| LDPE/PP Nonwoven 180° T-peel 12"/min | No F.T. 0.1 lb/in | No F.T. 0.3 lb/in | No F.T. 0.1 lb/in | F.T. (1 bond) 0.25 lb/in (2 bonds) | No F.T. 0.5 lb/in | F.T. (1 bond) 0.4 lb/in (2 bonds) | F.T. | F.T. |
| Water (pp/pp) Sensitivity | | | | | | | | |
| 15 min/70° F. | No F.T. | F.T. | Not Tested | No F.T. | F.T. | No F.T. | No F.T. | F.T. |
| 24 hr/70° F. | No F.T. | No F.T. | | No F.T. | F.T. | No F.T. | No F.T. | F.T. |
| 15 min/100° F. | No F.T. | F.T. | | No F.T. | F.T. | No F.T. | No F.T. | F.T. |
| 24 hr/100° F. | No F.T. | No F.T. | | No F.T. | F.T. | No F.T. | No F.T. | F.T. |
| Heat Stability (72 hrs/350° F.) | | | | | | | | |
| Color | Black | Amber | Not Tested | Dark Brown | Black | Brown | Dark Brown | Light Yellow |
| Gel | None | None | | None | None | None | None | None |
| Skin | None | None | | None | None | None | None | None |
| % viscosity change | −65.3% | −29.9% | | −66.9% | −59.6% | −50.0% | −67.1% | −24.8% |

Ucon 75H-90,000 is an ethylene oxide, propylene oxide copolymer containing approximately 75% ethylene oxide available from Union Carbide.
Permalyn 85 is a glycerol ester of rosin available from Hercules Inc.
Dymerex is a polymerized rosin available from Hercules, Inc.
Stereon 840A is a styrene butadiene block copolymer available from Firestone.
Zonatac 105 is a sytrenated polyterpene resin from Arizona Chemicals.
Kaydol USP White mineral oil is available from Witco.

The results presented in Table 2 demonstrate the suitability of a graft terpolymer (5) based on vinyl acetate, polyethylene oxide and polypropylene oxide/ethylene oxide for producing useful water sensitive bonds to both the nonwoven/nonwoven and nonwoven/LDPE constructions as contrasted with a commercially available block copolymer based hot melt adhesive (12). Incorporation of a compatible resin (6) increases the adhesion to low density polyethylene and is also useful. Also demonstrated in Table 2 is the use of a graft copolymer (7) based on vinyl acetate, vinyl-2-ethylhexanoate, polyethylene oxide, and polypropylene oxide/ethylene oxide. Although the graft copolymer (7) or similar copolymer compositions may prove useful without further formulation, formulating with compatible resins appears to improve the utility of the composition. It should also be noted the copolymer (7) is a novel composition of matter. Some properties such as LDPE/nonwoven adhesion and viscosity are improved

TABLE 3

| | 13 | 14 |
|---|---|---|
| 70 Vinyl Acetate/30 PEG-8000 Graft Copolymer | 100.0 | 90 |
| Deodorized rosin | | 10 |
| Glass Transition Temperature (Tg) | +5° C. | +9° C. |
| Viscosity at 350° F. | 2750 cps | 975 cps |
| Open Time | >15 Sec | >15 sec |
| Adhesion to Tissue | F.T. | F.T. |
| Adhesion to polypropylene nonwoven | F.T. | Not tested |
| Spray Characteristics | Good | Good |
| "strike-through" on tissue at 16-20 g/m² | good-no strike through | poor-strike through |
| 70° F./81% RH  3 days | none | |
| 70° F./81% RH  15 days | none | |
| peel (bonds aged 1 day) | 100° F. | |
| peel (bonds aged 1 week) | 110° F. | |
| shear (bonds aged 1 day) | 110° F. | |
| shear (bonds aged 1 week) | 120° F. | |
| Thermal Stability (72 hours/350° F.) | | |
| Color | Amber | Amber |
| Skin | None | None |
| Gel | None | None |

TABLE 3-continued

|  | 13 | 14 |
| --- | --- | --- |
| % viscosity | −17.3% | −25.1% |

This example shows a hot melt suitable for nonwoven and tissue applications (13). It uses no tackifier and yet provides a good bond. The use of a tackifier (14) results in strike-through which is undesirable for this specific formulation. Hot melt formulation (13) demonstrates the useful property of delayed crystallization which diminishes "strike-through" and results in an increase in heat resistance over time. The incorporation of tackifying resin for many such systems (e.g., 14), results in a retardation of crystallization which is detrimental to bonding of multi-ply tissue.

EXAMPLE 4

In this example a graft polymer comprising 45 parts by weight vinyl acetate, 15 parts butyl acrylate, 25 parts poly propylene oxide/ethylene oxide (75H-90,000) and 15 parts polyethylene oxide (PEG-8000) was tested "neat" and formulated as an adhesive for water sensitive nonwoven applications.

TABLE 4

|  | 15 | 16 |
| --- | --- | --- |
| 45 Vinyl Acetate/ | 100.0 | 70.0 |
| 15 Butyl Acrylate/ |  |  |
| 25 U Conn 75 H/90,000 |  |  |
| 15 PEG-8000 |  |  |
| Gum Rosin | — | 30.0 |
| Viscosity @ 350° F. | 2,725 cps | Not Tested |
| Nonwoven Adhesion | 0.22 lb/in | 0.42 lb/in |
| Nonwoven/LDPE Adhesion | 0.20 lb/in | 0.52 lb/in |
| Water Sensitivity |  |  |
| 15 min/70° F. | No F.T. | No F.T. |
| 24 hr/70° F. | No F.T. | No F.T. |
| 15 min/100° F. | No F.T. | No F.T. |
| 24 hr/100° F. | No F.T. | No F.T. |
| Heat Stability |  |  |
| (72 hrs/350° F.) |  |  |
| Color | Dark Brown | Dark Brown |
| Skin | Partial | Full |
| Gel | None | None |
| % Viscosity Change | −61.1% | Not Tested |

The neat polymer (15), in addition to being a novel composition of matter, exhibits acceptable adhesion to nonwoven and LDPE as well as water sensitivity. Incorporation of 30% resin (16) increases the adhesion values to both substrates without negatively affecting the water sensitivity and therefore such highly tackified formulations are particularly suitable for bonding of substrates such as in diaper construction. Although the color and skin formation are poorer than those reported in the prior examples, it is to be noted that no antioxidant was post added to either formulation. Addition of antioxidants such as are used by those skilled in the art will result in a reduction of skin formation.

We claim:

1. A process for bonding nonwoven fabric substrates to similar or dissimilar substrates comprising the steps of applying to at least one substrate a molten hot melt adhesive composition, said adhesive having a Tg of −40° to +40° C. comprising 50-100% of a graft copolymer comprising (a) 40-85 weight percent of at least one vinyl monomer and (b) 15-60 weight percent of at least one polyalkylene oxide polymer having a molecular weight greater than 3000 and a polymerized ethylene oxide content of at least 50% by weight, and 0-50 parts by weight of a compatible tackifying resin; and bonding another substrate thereto; the process being characterized in that the bond of the resulting construction will release when exposed to ambient temperature water.

2. The process of claim 1 wherein the dissimilar substrate is a low density polyolefin.

3. The process of claim 1 wherein the adhesive comprises 100% of the graft copolymer.

4. The process of claim 1 wherein the adhesives comprises 50-95% of the graft copolymer and 5-50 parts by weight of a compatible tackifying resin.

5. The process of claim 1 wherein a superabsorbent particulate polymer is bonded to a nonwoven substrate and wherein the adhesive comprises 100% of the graft copolymer.

6. The process of claim 1 wherein the adhesive is applied in a spray or melt blown pattern.

7. The process of claim 1 wherein the adhesive additionally comprises up to 25% by weight of a diluent selected from the group consisting of glycerol mono- and distearate, synthetic long chain linear polymeric alcohols, stearic acid, high acid number waxlike materials of mono- or dicarboxylic acids, acid wax derived from montan wax, stearyl alcohol, hydrogenated castor oil, ethoxylated alcohols, 12(OH) stearic acid and stearic-cetyl alcohol.

8. An article produced by the process of claim 1.

9. The article of claim 8 comprising a disposable diaper.

10. A process for the production of a nonwoven substrate comprising the step of bonding nonwoven fibers with a binder composition having a Tg of −40° to +40° C. comprising 50-100% of a graft copolymer comprising (a) 40-85 weight percent of at least one vinyl monomer and (b)15-60 weight percent of at least one polyalkylene oxide polymer having a molecular weight greater than 3000 and a polymerized ethylene oxide content of at least 50% by weight and 0-50 parts by weight of a compatible tackifying resin, and bonding another substrate thereto; the process being characterized in that the bond of the resulting construction will release when exposed to ambient temperature water.

11. A process for bonding nonwoven fabric substrates to similar or dissimilar substrates comprising the steps of applying to at least one substrate a molten hot melt adhesive composition, said adhesive having a Tg of −40° to +40° C. comprising 50-70 weight percent of a graft copolymer, said copolymer comprising (a) 40-85 weight percent of at least one vinyl monomer and (b) 15-60 weight percent of at least one polyalkylene oxide polymer having a molecular weight greater than 3000 and a polymerized ethylene oxide content of at least 50% by weight, and 30-50 parts by weight of a compatible tackifying resin, and bonding another substrate thereto; the process being characterized in that the bond of the resulting construction will release when exposed to ambient temperature water.

12. The process of claim 11 wherein the polyalkylene oxide polymer in the hot melt adhesive comprises an ethylene oxide propylene oxide copolymer containing at least 75% ethylene oxide.

13. A process for bonding nonwoven fabric substrates to similar or dissimilar substrates comprising the steps of applying to at least one substrate a molten hot melt adhesive composition, said adhesive having a Tg of −40° to +40° C. comprising 50-100% of a graft copolymer wherein the graft copolymer comprises 20-80% vinyl acetate, 5-65% vinyl 2-ethylhexanoate or butyl acrylate and 15-60% of at least one polyalkylene oxide polymer and 0-50% of a compatible tackifying resin, and bonding another substrate thereto; the process being characterized in that the bond of the resulting construction will release when exposed to ambient temperature water.

14. The process of claim 13 wherein the polyalkylene oxide polymer in the hot melt adhesive comprises an ethylene oxide propylene oxide copoylmer containing at least 75% ethylene oxide.

15. A disposable product containing incorporated therein superabsorbent particulate polymers, wherein the polymers are bonded into the disposable product using a hot melt adhesive having a Tg of $-40°$ to $+40°$ C. and comprising 50-100% by weight of a graft copolymer comprising (a) 40-85 weight percent of at least one vinyl monomer and (b) 15-60 weight percent of at least one polyalkylene oxide polymer having a molecular weight greater than 3000 and a polymerized ethylene oxide content of at least 50% by weight, and 0-50 parts by weight of a compatible tackifying resin; the product being characterized in that the bond of the resulting construction will release when exposed to ambient temperature water.

16. The disposable product of claim 15 wherein the polymers are bonded with an adhesive comprising 100% of the graft copolymer.

* * * * *